Oct. 11, 1960

H. S. LEVKOFF

2,955,400

OVERWRAPPING OF OPEN-TOP CARTONS

Filed Sept. 26, 1957

INVENTOR
Henry S. Levkoff
BY
ATTORNEYS

Oct. 11, 1960  H. S. LEVKOFF  2,955,400
OVERWRAPPING OF OPEN-TOP CARTONS
Filed Sept. 26, 1957  7 Sheets-Sheet 3

INVENTOR.
Henry S. Levkoff
BY
ATTORNEYS

H. S. LEVKOFF 2,955,400

OVERWRAPPING OF OPEN-TOP CARTONS

Filed Sept. 26, 1957

INVENTOR.
Henry S. Levkoff
BY

ATTORNEYS

# United States Patent Office 2,955,400
Patented Oct. 11, 1960

2,955,400

OVERWRAPPING OF OPEN-TOP CARTONS

Henry S. Levkoff, Great Neck, N.Y. (% Standard Folding Tray Corp., 85th St. and 24th Ave., Jackson Heights 69, N.Y.)

Filed Sept. 26, 1957, Ser. No. 686,465

8 Claims. (Cl. 53—228)

This invention relates to the overwrapping of open-top cartons with transparent sheet material and, more particularly, to a novel method and apparatus for performing this overwrapping operation.

In the overwrapping of open-top cartons with a transparent covering, it is conventional practice to have the covering material completely enclose the top, sides, ends and bottom of the carton. The covering material is usually folded over on itself at the ends of the carton, and the longitudinal edges of the covering material are generally sealed to one another in overlapping relation in contact with the bottom of the carton. In order to obtain this result, it has been necessary to provide relative vertical movement between the loaded but uncovered carton and the sheet of covering material, followed by horizontal movement of the thus-covered carton while the overlapping seam under the bottom of the carton is being permanently sealed.

When it is considered that the transparent covering for such a carton is approximately equal in cost to the carton itself, it will be appreciated that a substantial saving in the cost of raw material can be achieved if the covering sheet material can be permanently secured to the ends and sides of the loaded carton without also covering the bottom of the carton. The novel method and apparatus of my present invention achieves this result in an efficient manner.

The method of overwrapping a loaded open-top carton with sheet material according to the invention comprises raising the loaded carton vertically into contact with a substantially horizontally disposed piece of sheet material of sufficient area to cover the top and to be folded downwardly into contact with the side walls and end walls of the carton. The loaded carton with the thus-applied sheet material is then moved vertically upwardly into engagement with contact surfaces so as to fold peripheral portions of the sheet material downwardly against the side walls and end walls of the carton. The vertically upward relative movement between the thus-covered carton and the contact surfaces is then continued through a zone in which the folded peripheral portions of the sheet material are held in firm contact with the side walls and end walls of the carton for a sufficient period of time to permit the peripheral portions of the sheet material to become bonded to the side walls and end walls by means of an adhesive positioned between the sheet material and the carton walls. The method also includes a reversal of relative movement in which the loaded carton remains stationary and the sheet material and contact surfaces are moved downwardly over the stationary carton.

The apparatus of the invention comprises means for releasably supporting a substantially horizontally disposed piece of sheet material of sufficient area to cover the top and to be folded downwardly into contact with the side walls and end walls of the carton, means for vertically raising a carton to be covered into contact with the piece of sheet material, and releasing means for releasing the support of the piece of material to permit it to engage the top of and be folded downwardly about the ascending carton. A vertically disposed sealing chamber is positioned immediately above the level of contact between the carton and the piece of sheet material and folding means is positioned within the sealing chamber for folding the ends of the sheet material downwardly against the ends of the carton. The interior dimensions of the sealing chamber are substantially the same as the plan dimensions of the carton so as to insure firm contact of the folded peripheral portions of the sheet material with the sides and ends of the carton as the covered carton is moved upwardly through the sealing chamber, and lifting means are provided for raising the carton through the aforementioned covering and sealing stages.

These and other novel features of the invention can be more readily appreciated by reference to the accompanying drawings in which:

Figs. 4 through 7 and Figs. 4a through 7a are end views and perspective views, respectively, of progressive stages in the application of the covering sheet material to the open-top carton pursuant to the method and apparatus of the invention;

Figure 1:
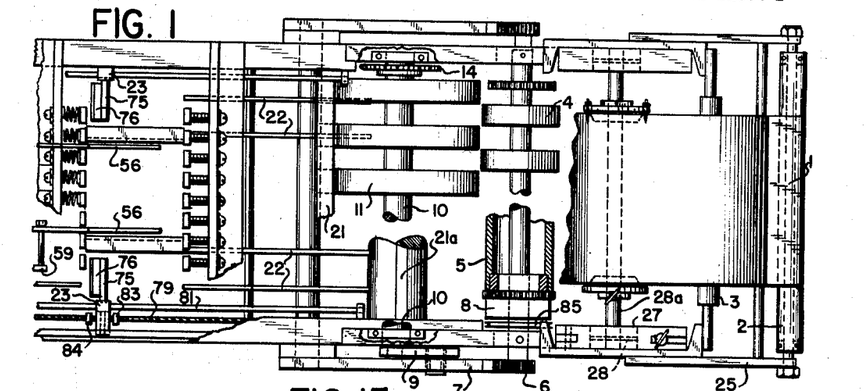
Fig. 1 is a plan view of the overwrapping apparatus.
Figures 2, 15:
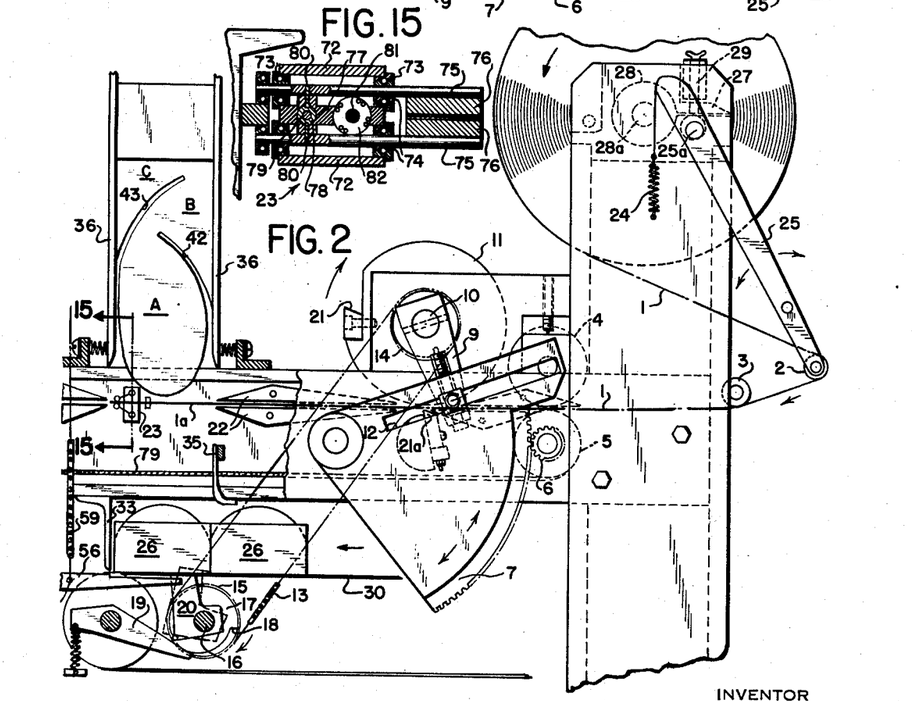
Fig. 2 is a front elevation, partly broken away, of the apparatus shown in Fig. 1.
Fig. 15 is a sectional view of the feed block taken along line 15—15 in Fig. 2.

The portion of the apparatus shown in Fig. 1 and Fig. 2 supplies the sheet material, such as a transparent cellulose film, a vinyl polymer or other similar material, or an opaque sheet material such as kraft paper or the like, into position for covering the top, sides and ends of a loaded open-top tray. The transparent sheet material 1 is supplied in the form of a roll from which it passes over a dancing roller 2 and an idler roller 3 to a pair of feed rollers 4 and 5, the lower roller 5 is driven by a gear 6 and the upper roller 4 is spring-urged downwardly against the sheet material 1 as it passes over the lower roller 5. The feed roller gear is operated by an oscillating segment gear 7, downward movement of the segment gear driving the feed roller in the "feed" direction. Upward movement of the segment gear merely operates a conventional overrunning clutch 8 between the feed roller and the feed roller gear, and thus the segment gear is returned to its lower position ready once again to drive the feed roller. The segment gear is driven by rotation of an arm 9 mounted on a supporting shaft 10 which carries a cut-off roller 11. The end of the arm 22 engages a radial slot 12 in the segment gear so that clockwise rotation of the arm 9 raises the segment gear 7 rapidly and lowers it more slowly. Rotation of the arm 9 is provided by a chain 13 running over a sprocket wheel 14 on the cut-off roller supporting shaft 10 and a similar sprocket drive wheel 15 on a main drive shaft 16. The main drive shaft is connected to the sprocket drive wheel 15 through a conventional clutch 17 provided with a step cam 18. The step cam is engaged by a clutch lock-out lever 19 operated by a detector finger 20.

Thus, movement of a loaded tray-type carton 26 along a delivery platform in the direction of the arrow causes the detector finger 20 to move counterclockwise and depress the clutch lock-out lever 19. The step cam is thus freed to rotate clockwise one revolution with the drive shaft 16 and effects positive engagement between the main drive shaft and the sprocket wheel 15. The resulting motion of the chain 13 causes the cut-off roller 11 and its associated arm 9 to make one complete revolution clockwise so as to drive the feed rollers 4 and 5 in a direction such as to move the transparent sheet material forward to the left in Fig. 2. At the completion of the single revolution of the roller 11, a knife blade 21 on the periphery of the roller engages a cooperating knife blade 21a and thus cuts off a piece of the transparent material. This piece of material, supported between guides 22, is engaged by a feed block 23 (described in detail later herein) which pulls the cut-off piece of material into position for engagement with a rising carton 26. As the driver rollers 4 and 5 pull more of the sheet material 1 during this operating sequence, the dancing roller 2 is pulled downwardly against a restraining spring 24. The resulting rotation of the arm 25 on the end of which the dancing roller is carried causes an eccentric shaft 25a on the arm 25 to open a spring-closed brake clamp 27 which engages a collar 28 on the shaft 28a of the supply roll of sheet material. The roll of sheet material is thus free to rotate in the direction of the arrow until the spring 24 returns the dancing roller supporting arm 25 to its upper position. At this point the clamp 27, under the pressure of a spring 29, tightens on the supply roll shaft collar and arrests its further rotation until the pull of the feed rollers 4 and 5 again moves the dancing roller 2 to its lower position indicated in Fig. 2.

Figure 3:
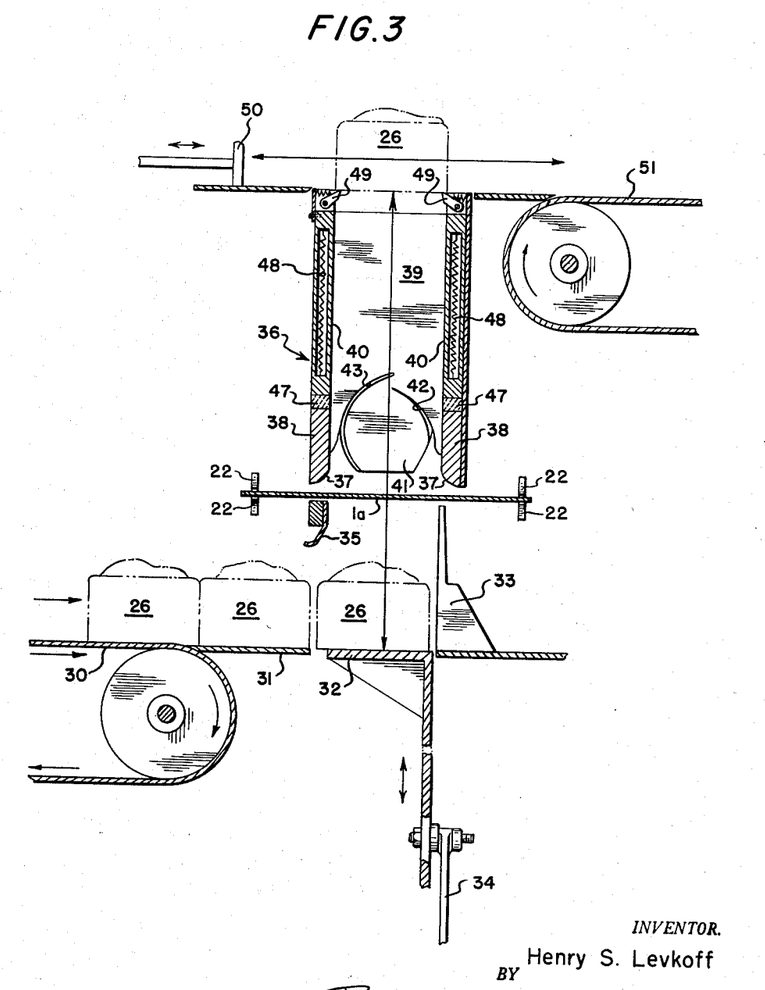
Fig. 3 is a side elevation of one modification of the sealing chamber of the invention provided with an elevator lift for moving the loaded carton therethrough.

The loaded tray 26, as shown in the sealing chamber assembly of Fig. 3, is delivered to a position beneath the piece of transparent material 1a by a conventional endless belt 30 which moves the loaded tray forward onto a projecting delivery platform 31 and thence onto an elevator platform 32. The loaded tray, as it is pushed onto the elevator platform 32, engages positioning stops 33 so as to align the tray with the center of the piece of transparent covering material 1a positioned immediately thereabove. The elevator platform 32, shown in Fig. 3 in its lowermost position, is moved upwardly by a reciprocating arm 34 so that the loaded tray 26 pushes upwardly against the piece of transparent covering material 1a. The simultaneous reversal of the direction of movement of the feed block 23 causes the feed block fingers 76 to release the forward end of the piece of covering material so that it is free to slide out of the guides 22 and thus be wrapped about the loaded tray as the tray is raised. Thereafter, in its upward movement in a path determined by the upper portion of the guide stop 33 and by an oppositely-positioned guide plate 35, the loaded tray is pressed upwardly against the center of the piece of transparent covering material 1a and the peripheral portions of this material are folded downwardly around the sides and ends of the carton. The carton in this condition is then moved further upwardly into the interior of a sealing chamber 36.

The lowermost inside edges 37 of one opposing pair of the side walls 38 of the sealing chamber are curved upwardly and inwardly so as to guide the covered tray into the interior of the chamber. Two additional oppositely disposed inner walls 39 are positioned within the sealing chamber at right angles to the first-mentioned pair of main side walls 38 having the curved lower edges 37. The side walls 38 and the inner walls 39 are so spaced from one another that their inner contact surfaces 40 press the peripheral portions of the piece of transparent covering material 1a firmly against the side walls and end walls of the carton. Each of the inner walls 39 comprises a lower central tongue portion 41 whose upper boundaries are defined by two inwardly curving arcuate slots 42 and 43 vertically spaced from one another. Each of these arcuate slots is cut diagonally through the side walls, as shown in Fig. 3, so that at any point along the cut the inside surface of the side wall adjacent the cut is higher than the outside surface adjacent the cut. This configuration of tongue portion and arcuate cuts provides means for folding the outwardly projecting peripheral portions of the piece of transparent material 1a downwardly into contact with the end walls of the carton.

Figure 4:
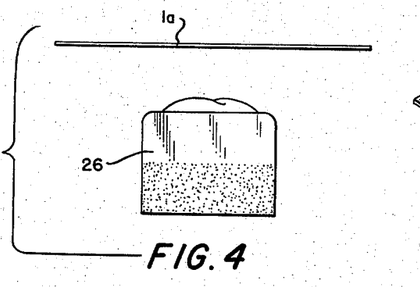
Figures 4A, 5A:
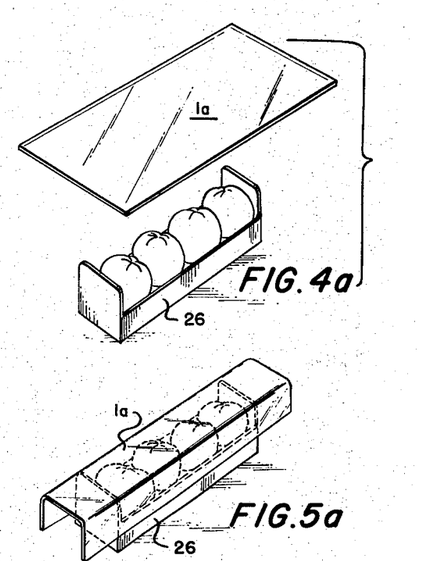
Figure 5:
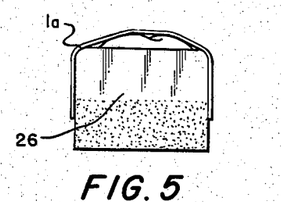
Figure 6:
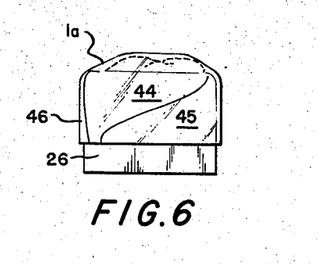
Figure 6A:
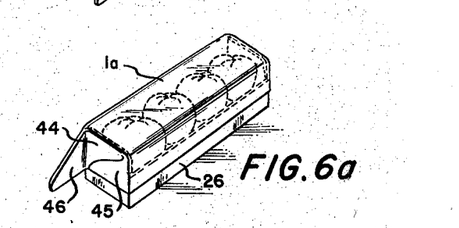
Figure 7:
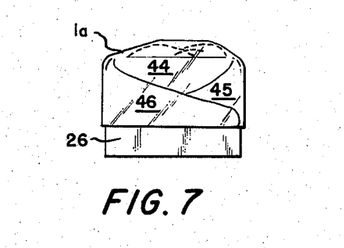
Figure 7A:
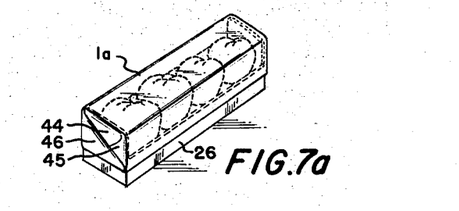

The operation of the aforementioned folding device in the complete sequence described so far is shown pictorially in Figs. 4 and 4a through Figs. 7 and 7a. Figs. 4 and 4a show the piece of transparent sheet material 1a and the open-top carton 26 in the same relative positions as they are shown in Fig. 3. Figs. 5 and 5a show the position of the piece of transparent material covering the top of the carton and its side walls at a position corresponding to the carton 26 having been raised until its side walls have entered between the lowermost inside edges 37 of the sealing chamber. Figs. 6 and 6a show how the central portion 44 of the outwardly projecting end of the transparent sheet material has been folded downwardly against the end wall of the carton by means of the tongue portion 41 and how the first arcuate slot 42 has caused one side portion 45 of this projecting end of the sheet material to be folded inwardly on top of portion 44. Figs. 7 and 7a show how further upward movement of the carton past the arcuate slot 43 causes the other side portion 46 of the projecting sheet material to be folded inwardly on top of portion 45.

The lower portion of the side walls 38 of the sealing chamber are advantageously separated from the upper portion of these side walls by an insulating barrier 47. Thus, the upper portion of the side walls, as shown in Fig. 3, may be provided with an interiorly embedded electric resistance unit 48 so as to heat the upper portion of the side walls 38. As the elevator platform 32 continues to raise the covered carton upwardly between the closely fitting inner contact surfaces 40 of the sealing chamber, the heat imparted to these surfaces is utilized to effect sealing of the peripheral portions of the covering material 1a to the side walls and end walls of the carton. As the elevator platform 32 finally raises the thus-sealed carton upwardly out of the open upper end of the sealing chamber 36, the carton first depresses spring loaded detents 49 and then these detents spring back into position under the bottom of the carton after the carton has passed upwardly beyond them. The covered material then is in the position indicated by the broken lines at the top of Fig. 3 whereupon a horizontally reciprocating plunger 50 moves the sealed carton laterally onto a moving belt 51 which, in turn, delivers the sealed carton to any suitable collecting station.

Figure 9:
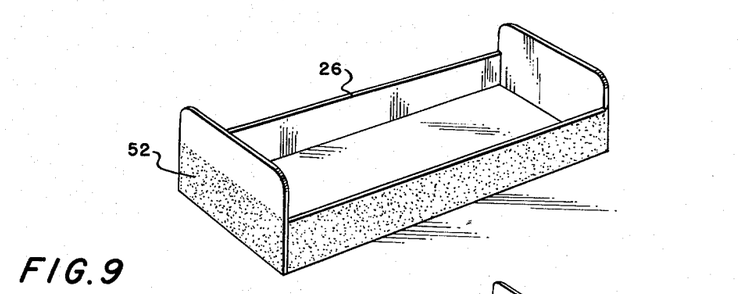
Fig. 9 is a perspective view of an open-top carton provided with a thermoplastic or heat sealing coating.
Figure 10:
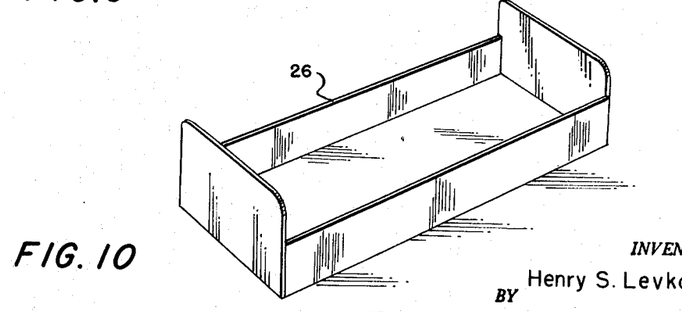
Fig. 10 is a perspective view of an open-top carton to which the applied covering is secured by a conventional adhesive.

The adhesive for bonding the transparent covering material to the side walls and end walls of the carton is advantageously applied to the carton prior to its being loaded. For example, as shown in Fig. 9, the carton 26 may be provided around its side walls and end walls with a covering of thermoplastic coating material or ink indicated by the stippled area 52. Phenol-formaldehyde (B-stage) adhesives, low molecular weight polyamide adhesives, vinyl acetate emulsions, latex, low molecular weight polyethylene adhesives (such as those compounded of low molecular weight polyethylene and polybutylene in admixture with a methylated paraffin), and waxes such as paraffin wax are useful thermoplastic coating materials for practicing the present invention, although these specific materials are only illustrative and not limitative of such materials. It will be readily understood, on the other hand, that an uncoated carton, such as that shown in Fig. 10, may be used and that a conventional air- or heat-drying adhesive may be applied or daubed along the carton side walls and end walls prior to the application to the loaded carton of the piece of transparent sheet material 1a.

Figure 11:
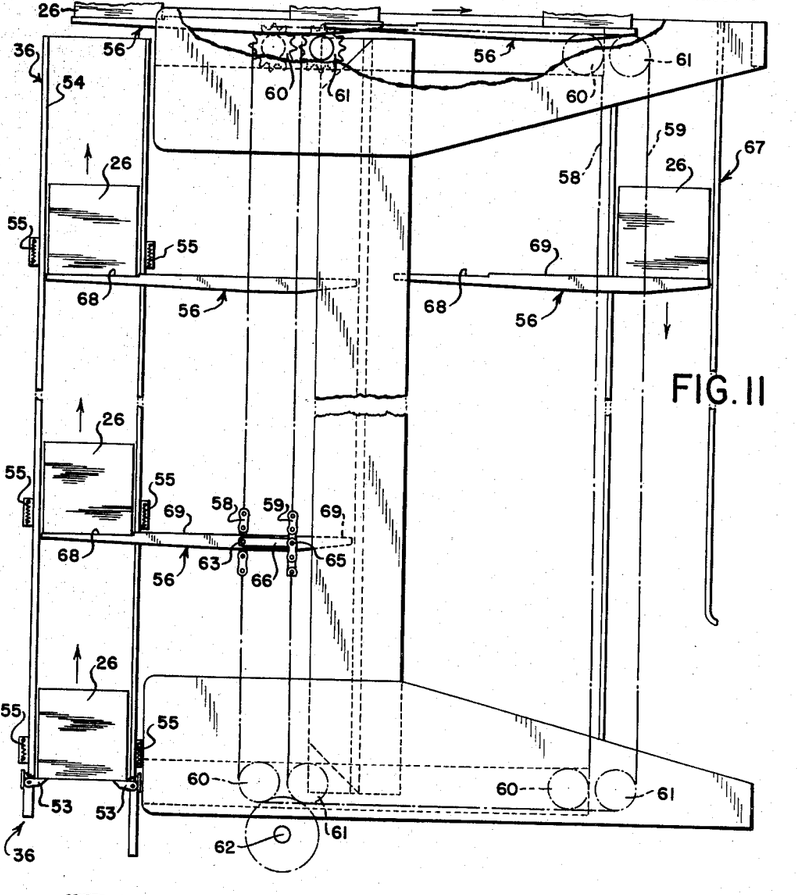
Fig. 11 is a partial side elevation of another modification of the overwrapping machine of the invention.
Figure 12:
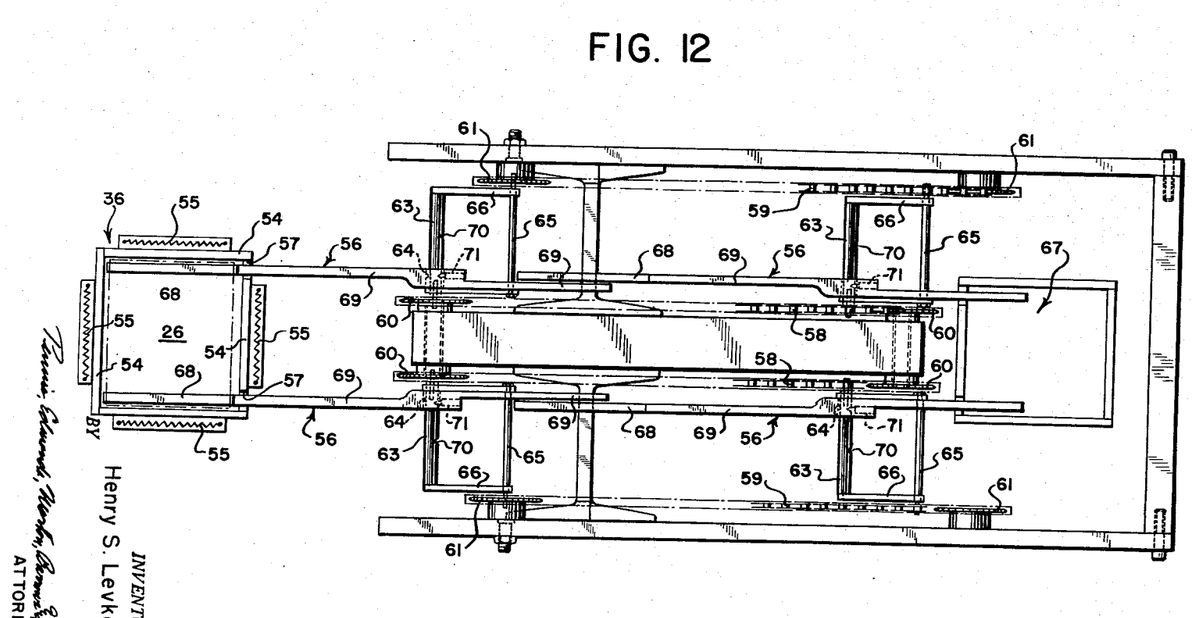
Fig. 12 is a plan view of the modification shown in Fig. 11.
Figure 13:
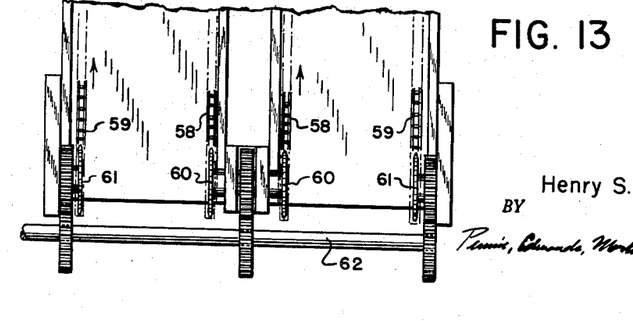
Fig. 13 is a side view of the lower portion of the modification shown in Fig. 11.

Another modification of the overwrapping apparatus of the invention is shown in Figs. 11, 12 and 13. In this modification, the lower portion of the sealing chamber 36 is substantially the same as that shown in Figs. 3 and 8. However, immediately above the folding zone, comprising the tongue 41 and the folding slots 42 and 43, the walls of the sealing chamber are provided with inwardly projecting detents 53 which, like the similar detents 49 shown in Fig. 3, support the covered carton at the uppermost end of the vertical stroke of the elevator platform 32. The portion of the sealing chamber above the detents 53 is more elongated in this modification than that shown in Fig. 3. This upper portion of the sealing chamber is defined by a rectangular well 54 the outer surfaces of which are provided at intervals with heaters 55 so that heat sealing may be provided throughout a much longer course of travel than that provided by the modification shown in Fig. 3.

In order to provide for the extensive vertical lifting of the covered carton through the sealing chamber 36, as shown in Fig. 11, the carton supported by the detents 53 is carried through the remainder of the chamber by pairs of lifting fingers 56 which extend through openings 57 (Fig. 12) extending longitudinally the full length of one side of the chamber. Each lifting finger 56 is carried by a pair of endless chains 58 and 59. The two chains are of identical length and are driven at identical speeds. This is achieved by mounting the chain 58 on four sprockets 60 and by mounting the chain 59 on another four sprockets 61 with the two sets of sprockets 60 and 61 disposed at the corners of two rectangular paths which have the same height and width but which are spaced from one another only in a horizontal direction. Thus, the path of the chain 58 defined by the four sprockets 60 is somewhat forward of the path of the chain 59 defined by the position of the sprockets 61, although the tops of the two paths are in the same horizontal plane. The two pairs of chains, one pair for each lifting finger of each pair thereof, are driven by a common drive shaft 62, as shown in Fig. 13, to insure coordinate drive of all four chains.

As shown in Figs. 11 and 12, the portion of each finger 56 adjacent the forward-positioned chains 58 is supported by an outwardly extending shaft 63 carried at one end by the chain 58 and extending through an opening 64 in that portion of the lifting finger. The other portion of each finger aligned with the rear-positioned chains 59 is supported at the outer end of a shaft 65 the inner end of which is carried by the chain 59. The outer end of the shaft 63 is supported by a connecting arm 66 which, in turn, is carried on the inner end of the second shaft 65. By this means, the two supported portions of each lifting finger 56 are maintained in a horizontally aligned position throughout the entire path of travel of the chains. Accordingly, the lifting fingers remain horizontal throughout the vertical and horizontal portions of the path of the chains and thus are capable of supporting the loaded cartons not only in their upward path but also across the top of the chain path and downwardly along the rearward path of the chains.

Figure 14A:
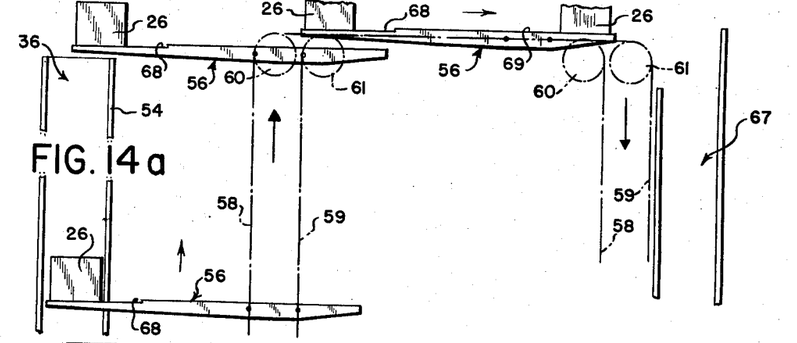
Figs. 14a, 14b and 14c are schematic representations of the progress of the covered carton at various stages in the operation of the apparatus shown in Figs. 11 and 12.
Figure 14B:
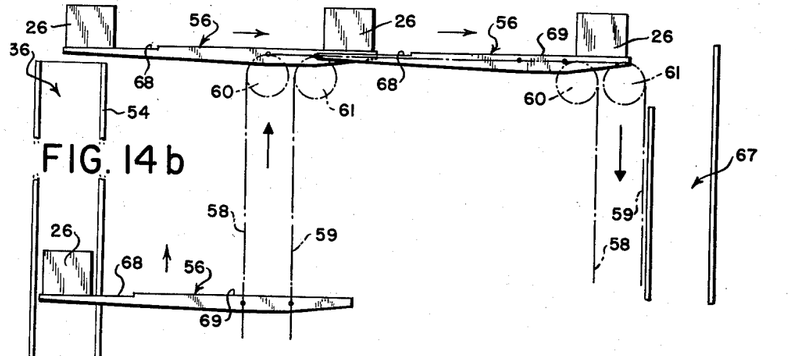
Figure 14C:
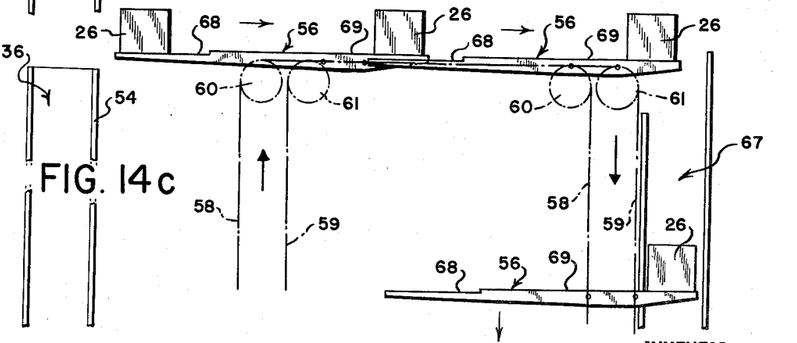

In order to enable the lifting fingers to carry the covered cartons horizontally from the upper end of the sealing chamber to the upper end of a discharge well 67, the portion of each finger which projects into the interior of the sealing chamber is provided with a depressed lifting surface 68. Accordingly, the remainder 69 of the upper surface of each lifting finger is at a slightly higher horizontal plane than the depressed surface portion 68. The interaction of these surface portions in successive pairs of fingers is illustrated schematically in Figs. 14a, 14b and 14c. As can be seen in Fig. 14a, the covered carton is lifted clear of the side walls 54 of the sealing chamber 36 while still resting on the depressed surface portion 68 of the lifting fingers. The pair of lifting fingers then moves horizontally toward the discharge well 67. However, as shown in Fig. 14b, the rearward surface portion 69 of the next succeeding pair of lifting fingers rises up under the covered carton being thus transported toward the discharge well. By forming the lifting fingers with the forward portion thereof offset from the rearward portion, as shown in Fig. 12, the ascending rearward portion of each finger comes up along side of the forward portion of the immediately preceding lifting finger at the top of its path of travel. Inasmuch as the rearward surface 69 of the ascending lifting finger is higher than the depressed forward surface 68 of the retreating preceding finger, the covered carton is transferred from the forward portion of each retreating pair of fingers to the rearward portion of the ascending pair of fingers. Thus, as shown in Fig. 14c, the covered carton is supported on the rearward portion of each pair of lifting fingers as these fingers approach and then descend through the discharge well 67. The lifting fingers 56 thus provide not only the upward vertical movement of the covered carton through the sealing chamber 36 but also the horizontal transfer and vertical lowering of the sealed carton through the discharge well 67. Further versatility is provided by forming one or more notches 70 in the surface of the lifting finger supporting shaft 63 and spring loaded detents 71 in the central body portion of each lifting finger so that the fingers of each pair may be moved toward or away from one another to accommodate cartons of different widths. Of course, a change in the width or length of the carton to be covered necessitates the use of a sealing chamber of corresponding proportions.

In lieu of the use of a combination of an elevator platform 32 and lifting fingers 56 as described hereinbefore with respect to Fig. 11, the lifting fingers may be used as the sole device for raising the loaded carton or tray through the covering, folding and sealing zones. Thus, in Figs. 1 and 2 it will be noted that the fingers 56 are arranged to rise below the loaded cartons on the conveyor belt 30 and to carry each carton vertically through all of the aforementioned zones.

The details of the feed block 23 (Figs. 1 and 2) are shown in Fig. 15. The block comprises an outer shell 72 having end plates 73. The end plates are provided with bearings 74 in which are mounted two shafts 75. Adjacent ends of the shafts 75 projecting beyond one end plate of the feed block are provided with finger plates 76 which converge or diverge with respect to one another as the shafts 75 are rotated. The central portion of the feed block is provided with a transverse supporting frame member 77 mounted in the end plates 73. An opening in the frame member accommodates a block 78 mounted on a cable 79 so that the block, which moves with the cable, is free to move within the frame member 77. A keyway in the upper and lower surfaces of the block 78 is engaged by pins 80 radially mounted on the shafts 75 so that as the block 78 moves the pins 80 are similarly moved and thus rotate the shafts 75.

The feed block 23 is carried by the cable 79 and a guide rod 81 which passes through a bearing 82 in the frame member 77. When the cable 79 is moved to the left in Fig. 1, it causes the finger shafts 75 to rotate so as to grasp the sheet of transparent material 1a, and then as a stop 83 mounted on the cable 79 engages the feed block the cable moves the entire feed block in the same direction. When the cable motion is reversed, the finger shafts are rotated to loosen the grasp on the sheet of transparent material 1a and another stop 84 on the cable carries the feed block back to its starting position. Oscillatory movement of the cable 79 is provided by a pulley 85 mounted on the shaft of the feed roller 5. Thus, the feed blocks 23 are adapted to grasp the free end of each sheet of transparent material as it is cut by the blades 21 and 21a and to carry the sheet forward into position immediately above a loaded carton about to be raised vertically into the covering zone.

Figure 8:
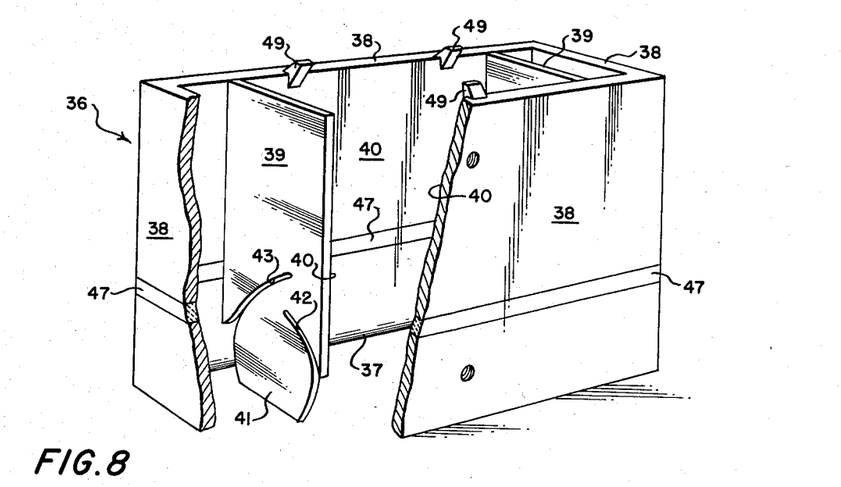
Fig. 8 is a perspective view, partly broken away, of the portion of the sealing chamber in which the covering material is folded about ends of the carton.

It will be readily apparent that, although the portions of the inner walls 38 comprising folding plates provided with the folding slots 42 and 43 may be made of a single piece as shown in Figs. 3 and 8, the portions A, B and C of the folding plates in Fig. 2 may be separate pieces. In the latter type of construction, the well may be made adjustable so as to accommodate cartons of different sizes, thus further enhancing the adaptability and utility of the overwrapping apparatus of the invention.

I claim:

1. Apparatus for overwrapping an open-top carton with sheet material which comprises supporting means for releasably positioning a substantially horizontally disposed piece of sheet material of sufficient area to cover the top and to be folded downwardly into contact with the side walls and end walls of the carton, releasing means for releasing the support of the piece of material to permit it to engage the top of and be folded downwardly about the side walls and end walls of an ascending carton, a vertically disposed sealing chamber positioned immediately above the level of contact between the carton and the piece of sheet material, folding means positioned within the sealing chamber for folding the ends of the sheet material downwardly against the end walls of the ascending carton, the cross-sectional dimensions of the sealing chamber being substantially the same as those of the carton so as to insure firm contact of the folded peripheral portions of the sheet material with the side walls and end walls of the carton as the covered carton is moved upwardly through the sealing chamber, and lifting means for raising the carton through the aforementioned contacting, folding and sealing stages of its vertical path.

2. Apparatus for overwrapping an open-top carton with sheet material which comprises supporting means for releasably positioning a substantially horizontally disposed piece of sheet material of sufficient area to cover the top and to be folded downwardly into contact with the side walls and end walls of the carton, releasing means for releasing the support of the piece of material to permit it to engage the top of and be folded downwardly about the side walls and end walls of an ascending carton, a vertically disposed sealing chamber positioned immediately above the level of contact between the carton and the piece of sheet material, folding means positioned within the sealing chamber for folding the ends of the sheet material downwardly against the end walls of the ascending carton, said folding means comprising a pair of fold-forming plates each of which is provided with a pair of slots formed in the shape of an upwardly directed arc, one of the arc-shaped slots of each pair thereof beginning at the lowermost side edge of each fold-forming plate and the other of the arc-shaped slots beginning at the other side edge of each plate at a level above the lower end of the first-mentioned slot but below the upper end thereof and extending arcuately above the upper end of said first-mentioned slot, the cross-sectional dimensions of the sealing chamber being substantially the same as those of the carton so as to insure firm contact of the folded peripheral portions of the sheet material with the side walls and end walls of the carton as the covered carton is moved upwardly through the sealing chamber, and lifting means for raising the carton through the aforementioned contacting, folding and sealing stages of its vertical path.

3. Apparatus for overwrapping an open-top carton with sheet material which comprises supporting means for releasably positioning a substantially horizontally disposed piece of sheet material of sufficient area to cover the top and to be folded downwardly into contact with the side walls and end walls of the carton, releasing means for releasing the support of the piece of material to permit it to engage the top of and be folded downwardly about the side walls and end walls of an ascending carton, a vertically disposed sealing chamber positioned immediately above the level of contact between the carton and the piece of sheet material, folding means positioned within the sealing chamber for folding the ends of the sheet material downwardly against the end walls of the ascending carton, the cross-sectional dimensions of the sealing chamber being substantially the same as those of the carton so as to insure firm contact of the folded peripheral portions of the sheet material with the side walls and end walls of the carton as the covered carton is moved upwardly through the sealing chamber, and lifting means comprising an elevator platform for raising the carton through the aforementioned contacting, folding and sealing stages of its vertical path.

4. Apparatus for overwrapping an open-top carton with sheet material which comprises supporting means for releasably positioning a substantially horizontally disposed piece of sheet material of sufficient area to cover the top and to be folded downwardly into contact with the side walls and end walls of the carton, releasing means for releasing the support of the piece of material to permit it to engage the top of and be folded downwardly about the side walls and end walls of an ascending carton, a vertically disposed sealing chamber positioned immediately above the level of contact between the carton and the piece of sheet material, folding means positioned within the sealing chamber for folding the ends of the sheet material downwardly against the end walls of the ascending carton, the cross-sectional dimensions of the sealing chamber being substantially the same as those of the carton so as to insure firm contact of the folded peripheral portions of the sheet material with the side walls and end walls of the carton as the covered carton is moved upwardly through the sealing chamber, and lifting means comprising lifting fingers for raising the carton through the aforementioned contacting, folding and sealing stages of its vertical path.

5. Apparatus for overwrapping an open-top carton with sheet material which comprises supporting means for releasably positioning a substantially horizontally disposed piece of sheet material of sufficient area to cover the top and to be folded downwardly into contact with the side walls and end walls of the carton, releasing means for releasing the support of the piece of material to permit it to engage the top of and be folded downwardly about the side walls and end walls of an ascending carton, a vertically disposed sealing chamber positioned immediately above the level of contact between the carton and the piece of sheet material, folding means positioned within the sealing chamber for folding the ends of the sheet material downwardly against the end walls of the ascending carton, the cross-sectional dimensions of the sealing chamber being substantially the same as those of the carton so as to insure firm contact of the folded periperal portions of the sheet material with the side walls and end walls of the carton as the covered carton is moved upwardly through the sealing chamber, lifting means for vertically raising a carton to be covered past the level of contact between the carton and the piece of sheet material, and second lifting means for raising the carton through the aforementioned folding and sealing stages of its vertical path.

6. Apparatus for overwrapping an open-top carton with sheet material which comprises supporting means for releasably positioning a substantially horizontally disposed piece of sheet material of sufficient area to cover the top and to be folded downwardly into contact with the side walls and end walls of the carton, releasing means for releasing the support of the piece of material to permit it to engage the top of and be folded downwardly about the side walls and end walls of an ascending carton, a vertically disposed sealing chamber positioned immediately above the level of contact between the carton and the piece of sheet material, folding means positioned within the sealing chamber for folding the ends of the sheet material downwardly against the end walls of the ascending carton, the cross-sectional dimensions of the sealing chamber being substantially the same as those of the carton so as to insure firm contact of the folded peripheral portions of the sheet material with the side walls and end walls of the carton as the covered carton is moved upwardly through the sealing chamber, lifting means for vertically raising a carton to be covered past the level of contact between the carton and the piece of sheet material, and lifting fingers mounted on an endless carrier for raising the carton in a substantially vertical path through the aforementioned folding and sealing stages, the fingers projecting into the interior of the sealing chamber through vertical slots in a side wall thereof.

7. Apparatus for overwrapping an open-top carton with sheet material which comprises supporting means for releasably positioning a substantially horizontally disposed piece of sheet material of sufficient area to cover the top and to be folded downwardly into contact with the side walls and end walls of the carton, releasing means for releasing the support of the piece of material to permit it to engage the top of and be folded downwardly about the side walls and end walls of an ascending carton, a vertically disposed sealing chamber positioned immediately above the level of contact between the carton and the piece of sheet material, folding means positioned within the sealing chamber for folding the ends of the sheet material downwardly against the end walls of the ascending carton, the cross-sectional dimensions of the sealing chamber being substantially the same as those of the carton so as to insure firm contact of the folded peripheral portions of the sheet material with the side walls and end walls of the carton as the covered carton is moved upwardly through the sealing chamber, and lifting means for raising the carton through the aforementioned contacting, folding and sealing stages, the lifting means including lifting fingers adapted to carry the covered carton through the sealing stage, the lifting fingers being disposed in pairs at vertically spaced levels along an endless carrier arranged to carry the fingers through a rectangular path one vertical leg of which carries a forwardly-projecting portion of the fingers through the aforementioned sealing chamber, the forward upper surface of each lifting finger being depressed below the level of the upper surface of the rearward portion thereof.

8. In apparatus for overwrapping an open-top carton with sheet material in which the carton with peripheral portions of the sheet material folded downwardly against the outside of opposite walls of the carton is carried vertically through a closely fitting sealing chamber, the improvement which comprises lifting fingers for carrying the covered carton through the sealing chamber, the lifting fingers being disposed in pairs at vertically spaced levels along an endless carrier arranged to carry the fingers through a rectangular path one vertical leg of which carries a forwardly-projecting portion of the fingers through the aforementioned sealing chamber, the forward upper surface of each lifting finger being depressed below the level of the upper surface of the rearward portion thereof.

References Cited in the file of this patent
UNITED STATES PATENTS

| | | |
|---|---|---|
| 1,414,706 | Peterson | May 2, 1922 |
| 1,640,860 | Sutter | Aug. 30, 1927 |
| 1,647,289 | Gwinn | Nov. 1, 1927 |
| 2,418,449 | Arvidson | Apr. 8, 1947 |
| 2,623,338 | Reimer | Dec. 30, 1952 |
| 2,653,433 | Sandberg | Sept. 29, 1953 |
| 2,848,856 | Brock | Aug. 26, 1958 |